H. BROWN.
Churn.
No. 19,828.
Patented April 6, 1858.
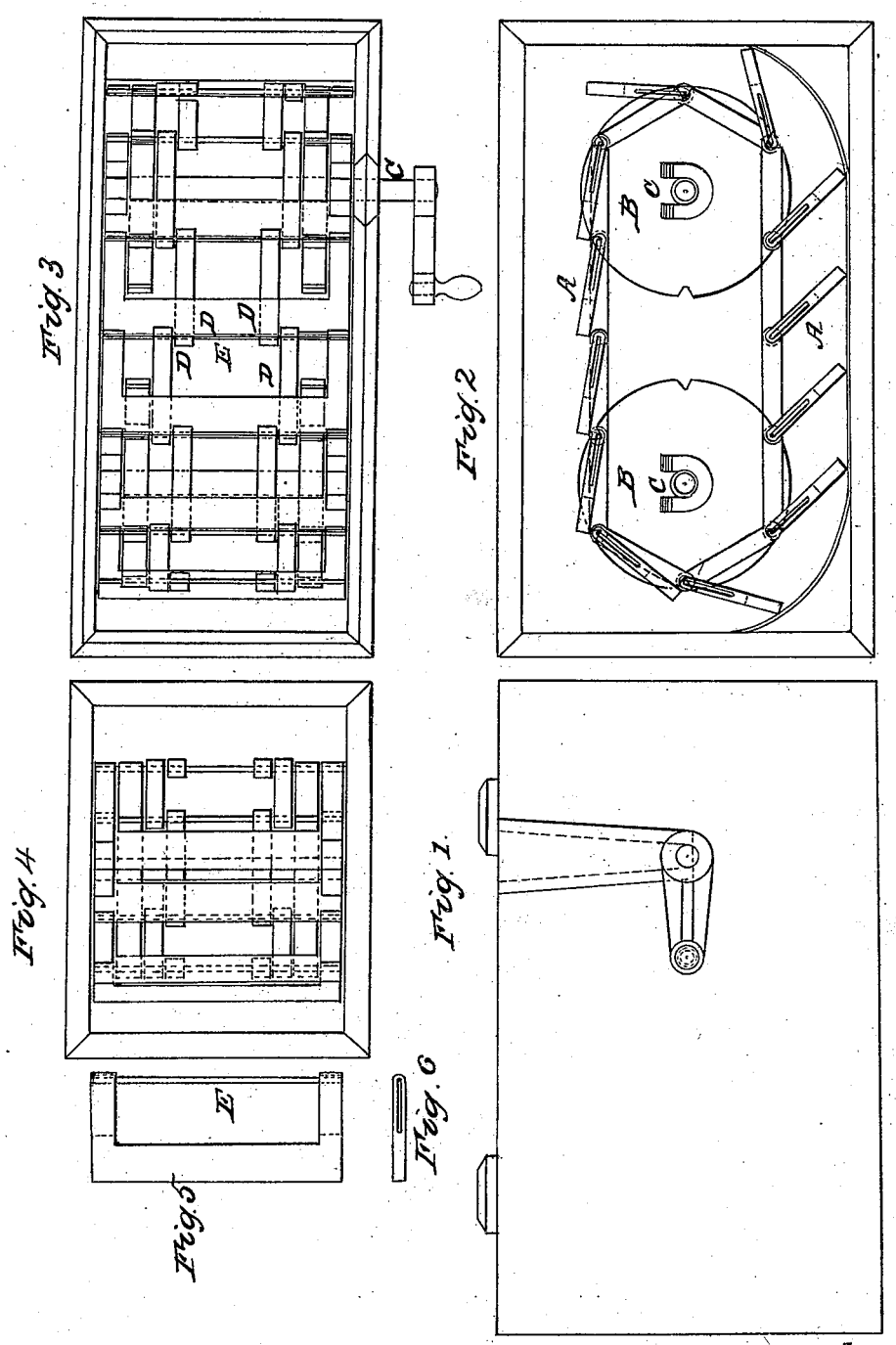
Inventor
H. Carey Brown

UNITED STATES PATENT OFFICE.

HARVEY BROWN, OF NEW YORK, N. Y.

CHURN.

Specification of Letters Patent No. 19,828, dated April 6, 1858.

*To all whom it may concern:*

Be it known that I, HARVEY BROWN, of the city, county, and State of New York, have invented a new and useful Improvement in Churns; and I do hereby declare that the following is a full, clear, and exact description of the construction and operation of the same, reference being had to the annexed drawings, making a part of this specification, in which—

Figure 1 is a side elevation of the exterior of the churn; Fig. 2, a sectional view of the interior; Fig. 3, a bird's-eye view or plan of the gearing composed of wheels, links, connecting rods, and trailing paddles; Fig. 4, a transverse or end view of the gearing; Fig. 5, a detached trailing paddle; Fig. 6, an end view of Fig. 5.

A, the trailing paddles, of which there are twelve in the model; any number desired can be put in; B, the disks or wheels upon which the gearings are mounted and by which they are moved by means of the crank; C, the shaft; D, the links; E, the connecting rods.

To enable others skilled in the art to make and use my invention I will proceed to describe its construction and operation.

I make a box of wood or metal with size and form adapted to the work to be accomplished; within this box I place two shafts marked, C, one of which at one end passes through the side of the box for the purpose of receiving the crank or power by which the churn is to be operated. The other three ends of the shafts rest on bearings attached to the inside of the box at regular spaced distances apart. To these shafts I attach the wheels or disks marked B, two to each shaft, the peripheries of which I divide into regular equal spaces by cutting notches; I next make an endless chain in any desired form of wood or metal the links of which between the center of the rods marked, E, (by which the links marked, D, are connected,) shall be just equal to the spaces between the notches in the peripheries of the wheels and by placing the wheels at corresponding distances apart with the notches therein, the chain mounted on these wheels, the connecting rods in the notches and made to rotate by the crank or other power moves with ease and certainty; I next attach the trailing paddles marked, A, to the connecting rods of the chain. I make these trailing paddles of wood or metal in any desired form in which they will operate as in the manner set forth in the drawings; a floating board may be inserted upon the top of the cream or milk when the churn is filled for operation by which a degree of friction may be produced in the return course of the trailing paddles as they move upon the top of the wheels and gearing.

The object of this invention is the churning of butter by agitation incidentally but more particularly by friction from the operation of the trailing paddles as attached to an endless chain in this invention, or to a single cylinder to which they might be attached and inclosed in a corresponding box.

What I claim as my invention and desire to secure by Letters Patent is—

The arrangement of the trailing paddles, wheels, and gearing operated substantially in the manner and for the purposes set forth.

HARVEY BROWN.

Witnesses:
WILLIAM T. GRAFF,
R. H. CUDLIFF.